US012746703B2

(12) United States Patent
Cornell et al.

(10) Patent No.: US 12,746,703 B2
(45) Date of Patent: Sep. 29, 2026

(54) CHAINSAW SAFETY FEATURE

(71) Applicant: Milwaukee Electric Tool Corporation, Brookfield, WI (US)

(72) Inventors: Brian A. Cornell, Brookfield, WI (US); Craig A. Kottke, Brookfield, WI (US); Andrew W. Beilfuss, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 210 days.

(21) Appl. No.: 18/627,664

(22) Filed: Apr. 5, 2024

(65) Prior Publication Data

US 2024/0335973 A1 Oct. 10, 2024

Related U.S. Application Data

(60) Provisional application No. 63/494,537, filed on Apr. 6, 2023.

(51) Int. Cl.
*B27B 17/02* (2006.01)
*B27B 17/08* (2006.01)

(52) U.S. Cl.
CPC ............ *B27B 17/02* (2013.01); *B27B 17/083* (2013.01)

(58) Field of Classification Search
None
See application file for complete search history.

(56) References Cited

U.S. PATENT DOCUMENTS

| | | | | |
|---|---|---|---|---|
| 3,847,233 | A * | 11/1974 | Glover | H01H 3/20 200/318.2 |
| 4,028,804 | A * | 6/1977 | Hammond | B27B 17/08 123/198 D |
| 4,879,438 | A * | 11/1989 | Winchester | H01H 9/06 310/50 |
| 5,577,600 | A * | 11/1996 | Schoene | H01H 3/20 200/321 |
| 5,638,945 | A * | 6/1997 | Fukinuki | H01H 3/20 200/321 |
| 2018/0065270 | A1* | 3/2018 | Sarius | B27B 33/142 |
| 2018/0354153 | A1* | 12/2018 | Meier | B27B 17/0025 |
| 2023/0173708 | A1* | 6/2023 | Burden | B27B 17/02 30/123.4 |
| 2023/0356427 | A1* | 11/2023 | Libert | B27B 17/083 |
| 2024/0335973 | A1* | 10/2024 | Cornell | B27B 17/00 |

* cited by examiner

*Primary Examiner* — Hwei-Siu C Payer
(74) *Attorney, Agent, or Firm* — Dority & Manning, P.A.

(57) ABSTRACT

A chainsaw including a guide bar; a chain disposed around the guide bar and movable relative to the guide bar; a motor operably coupled to the chain to drive the chain about the guide bar; a handle; a speed controller in communication with the motor to affect a motor speed; and a momentary switch, wherein the momentary switch restricts actuation of the speed controller when the momentary switch is in a resting state, wherein the momentary switch allows actuation of the speed controller when the momentary switch is in an activated state, wherein the momentary switch comprises a base rotatably coupled to the handle and an articulated arm rotatably coupled to the base, and wherein the momentary switch is biased to the resting state.

20 Claims, 7 Drawing Sheets

CHAINSAW SAFETY FEATURE

CROSS-REFERENCE TO RELATED APPLICATIONS

The present application claims priority to U.S. Provisional Patent Application 63/494,537 filed on Apr. 6, 2023, the disclosure of which is incorporated by reference herein in its entirety.

FIELD

The present disclosure relates generally to chainsaws, and more particularly to a safety feature for a chainsaw.

BACKGROUND

Chainsaws utilize a moving chain with cutting teeth that are arranged to cut into material, such as wood, as the teeth are driven along an outer perimeter of a guide bar. The teeth are driven along the outer perimeter of the guide bar in an infinite, continuous manner by a driving element. The driving element is controlled by a trigger located on a handle of the chainsaw. As the operator engages the trigger, the speed of the driving element changes, changing the speed of the cutting teeth with respect to the material being cut. As the cutting teeth move faster, operating hazards for the user controlling the chainsaw increase.

Accordingly, improved safety features for chainsaws are desired in the art. In particular, chainsaws which provide easy to use safety features would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a chainsaw is provided. The chainsaw includes a guide bar; a chain disposed around the guide bar and movable relative to the guide bar; a motor operably coupled to the chain to drive the chain about the guide bar; a handle; a speed controller in communication with the motor to affect a motor speed; and a momentary switch, wherein the momentary switch restricts actuation of the speed controller when the momentary switch is in a resting state, wherein the momentary switch allows actuation of the speed controller when the momentary switch is in an activated state, wherein the momentary switch comprises a base rotatably coupled to the handle and an articulated arm rotatably coupled to the base, and wherein the momentary switch is biased to the resting state.

In accordance with another embodiment, a momentary switch for a chainsaw is provided. The momentary switch includes a base configured to be rotationally coupled to a handle of the chainsaw; an articulated arm rotatably coupled to the base; a first biasing element configured to bias the base to a first rotational position with respect to the handle; and a second biasing element configured to bias the articulated arm to a first rotational position with respect to the base.

In accordance with another embodiment, a method of using a chainsaw is provided. The method includes applying a force to an articulated arm of a momentary switch to cause the momentary switch to reconfigure from a resting state to an intermediate state by rotating an articulated arm of the momentary switch relative to a base of the momentary switch; continuing to apply force to the momentary switch to reconfigure the momentary switch from the intermediate state to an activated state; actuating a speed controller after the momentary switch is reconfigured to the activated state; and maintaining force on the momentary switch to maintain the momentary switch in the activated state, wherein the momentary switch is biased to the resting state.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
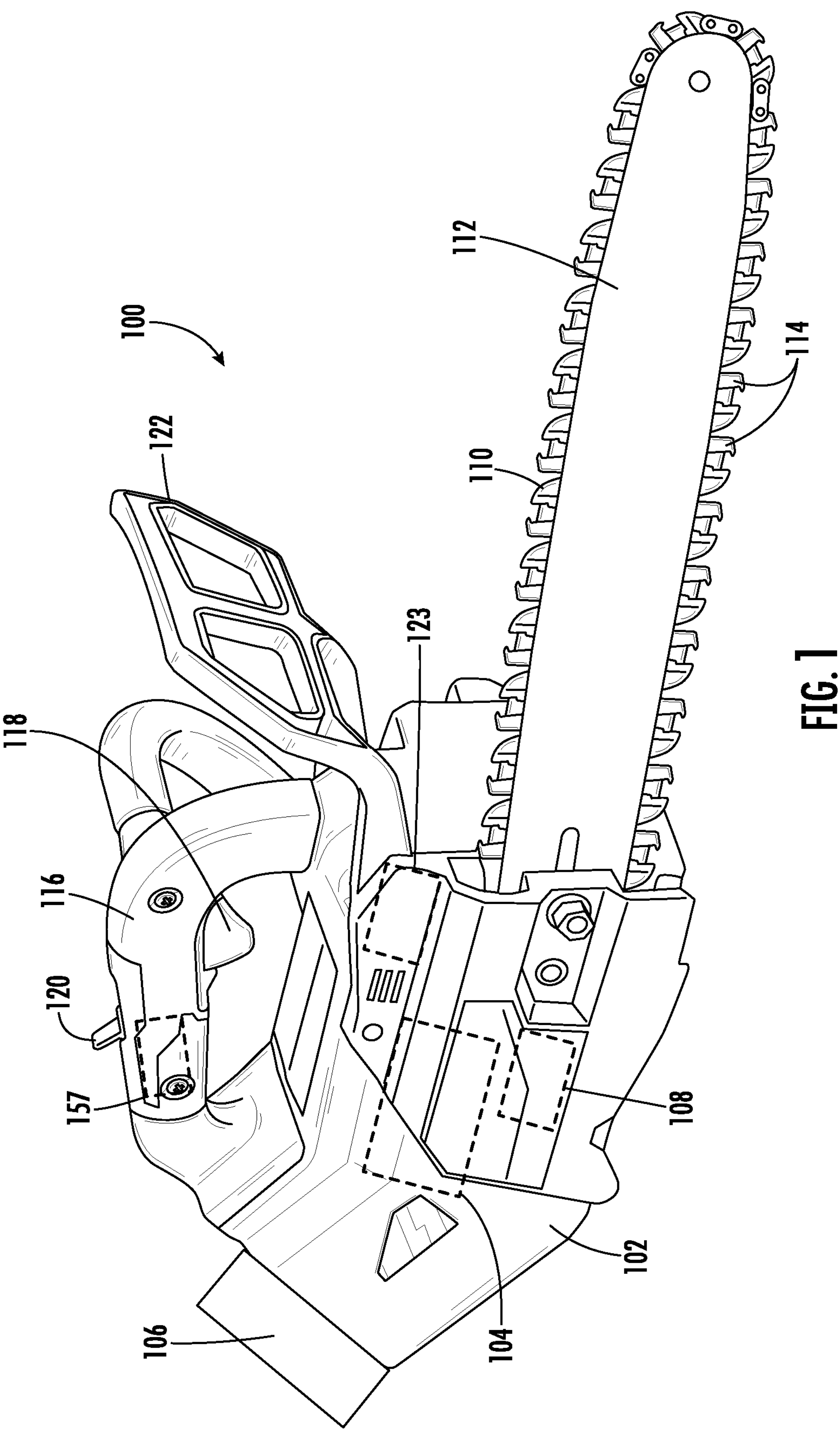
FIG. 1 is a perspective view of a chainsaw in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms “first”, “second”, and “third” may be used interchangeably to distinguish one component from another and are not intended to signify location or importance of the individual components. The singular forms “a,” “an,” and “the” include plural references unless the context clearly dictates otherwise. The terms “coupled,” “fixed,” “attached to,” and the like refer to both direct coupling, fixing, or attaching, as well as indirect coupling, fixing, or attaching through one or more intermediate components or features, unless otherwise specified herein. As used herein, the terms “comprises,” “comprising,” “includes.” “including.” “has.” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, “or” refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as “about,” “generally,” “approximately,” or “substantially,” include values within ten percent greater or less than the stated value. When used in the context of an angle or direction, such terms include within ten degrees greater or less than the stated angle or direction. For example, “generally vertical” includes directions within ten degrees of vertical in any direction, e.g., clockwise or counter-clockwise.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, embodiments in accordance with the present disclosure are directed to features associated with a chainsaw that are configured to prevent the chainsaw from operating unless the operator maintains a sufficient grip on a handle of the chainsaw. The safety feature can be biased from an activated state to a resting state. In the resting state, the chainsaw is prevented from driving an infinite chain about a guide bar. In the activated state, the chainsaw can operate such that the infinite chain is movable about the guide bar to cut an object. The safety feature can include a plurality of pieces, such as two pieces which are movably coupled together. The plurality of pieces can create a large area of engagement for a user to maintain the safety feature in the activated, thereby mitigating any undesirable pressure points on the user’s hand during use, while simultaneously providing a low-profile and easy interactive design so that the user can easily grasp the safety feature to activate the safety feature and operate the chainsaw.

Referring now to the drawings, FIG. 1 illustrates a perspective view of a chainsaw 100 in accordance with an example embodiment. The chainsaw 100 is a motorized, handheld power tool including a housing 102 in which a motor 104 is at least partially disposed. The motor 104 can include, for example, a direct current (DC) motor that receives power from a power source, such as one or more removable batteries 106 (referred to hereinafter as the battery 106). The battery 106 may be in electrical communication with a logic device 108, such as a printed circuit board (PCB), including control circuitry that selectively provides power to the motor 104 from the battery 106. The motor 104 can include an output shaft that is rotatably driven and which interfaces with a driving gear in operable communication with a chain 110. The chain 110 can move around a guide bar 112 and be infinitely driven by the motor 104 through the driving gear. Power supplied from the battery 106 to the motor 104 drives the chain 110 around the guide bar 112, allowing cutting teeth 114 of the chain 110 to remove material from an object being operated on, such as a log or tree.

The chainsaw 100 can further include a handle 116 by which a user can grasp and control operation of the chainsaw 100. The handle 116 can include control features, such as a speed controller 118 (e.g., an actuatable trigger) and a power selector 120 movable between an on state and an off state to selectively connect and disconnect the motor 104 from the battery 106. To operate the chainsaw 100, the power selector 120 is moved from an off state to an on state. Once the power selector 120 is moved to the on state, the user can interact with the speed controller 118 to change a driving speed of the chain 110 based on a relative position of the speed controller 118 between a non-driven speed (i.e., 0 RPM) and a maximum speed, e.g., as set by the manufacturer and limited, e.g., by the motor 104.

A guard 122 can be disposed between the handle 116 and the chain 110. The guard 122 is movably mounted to the housing 102. A position of the guard 122 can be detected by a sensor in communication with the logic device 108 to affect control of the motor 104. If the chainsaw 100 experiences kickback (i.e., a rotational impulse that causes the chainsaw 110 to move (rotate) towards the user), the guard 122 may hit the user (for example in the arm), causing the guard 122 to pivot from an in-use position to a brake position. When the logic device 108 receives a signal from the sensor 123 indicative of the guard 122 having been displaced, the logic device 108 terminates power supply to the motor 104. In some implementations, the chainsaw 100 can further include a brake (not illustrated) that rapidly stops motion of the chain 110, e.g., in response to kickback. This may be referred to as braking.

There is a commercial need for additional safety features to protect the user from kickback and other dangers associated with movement of the cutting teeth 114. As described below, it is contemplated herein that the chainsaw 100 may include a momentary switch that the user must maintain in an activated state to operate the chainsaw 100, i.e., to drive the chain 110 around the guide bar 112. The momentary switch can be normally open, e.g., biased to a resting state whereby the motor 104 is prevented from driving the chain 110. To activate the momentary switch, i.e., to drive the chain 110, the user must reposition the momentary switch from the resting state to the activated state. In the activated state, the user can selectively engage the speed controller 118 and/or another control implement of the chainsaw 100 to control operation of the chain 110 and perform a cutting operation. The momentary switch automatically returns to the resting state when released, preventing operation of the chainsaw 100 when the user releases the handle 116. In this regard, the momentary switch can prevent the user from accidently driving the chain 110 when the user is not actively holding the handle 116 or is improperly holding the handle 116, e.g., with a weak grasp.

In some instances, the momentary switch described below can replace the power selector 120. That is, the momentary switch can act as the power selector 120. In other instances, the momentary switch can be used in combination with the power selector 120 to control the chainsaw 100. In such embodiments, the user must reconfigure the power selector 120 to the on state and move the momentary switch to the activated state to drive the chain 110. It should be understood that embodiments described herein may be applicable to either or both configurations (i.e., with or without the further inclusion of the power selector 120).

Figure 2:
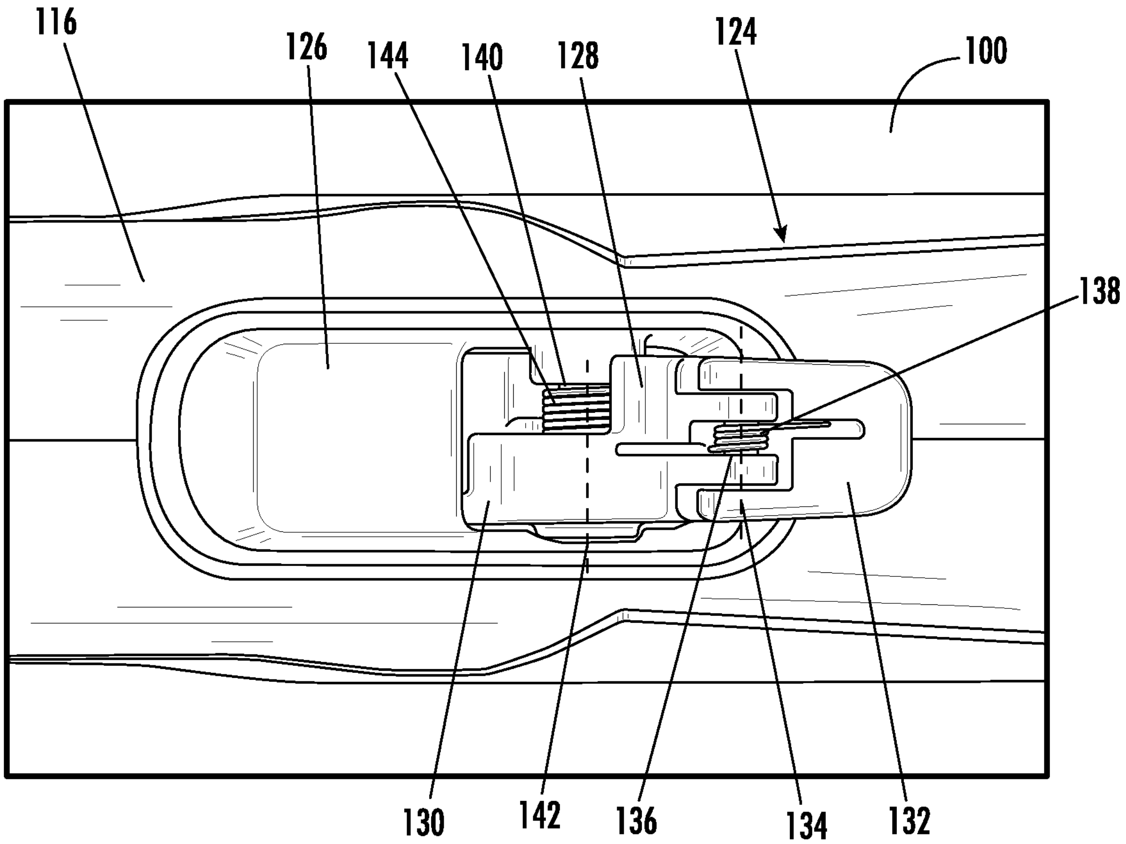
FIG. 2 is a top view of a portion of a handle of the chainsaw of FIG. 1, the portion including a momentary switch disposed in a resting state in accordance with embodiments of the present disclosure.

FIG. 2 illustrates a portion of the handle 116 as seen viewed from the top of the chainsaw 100. As depicted, the handle 116 defines a graspable surface 124 which the user contacts (e.g., with their hand) when holding the chainsaw 100. The user can wrap their hand around the graspable surface 124 to interact with the speed controller 118. The speed controller 118 may be located at a lower side of the handle 116 such that the user can actuate the speed controller 118 using their index and/or middle finger(s). The handle 116 further includes a recessed portion 126 that extends into the handle 116 from the surface 124. The recessed portion 126 is depicted in FIG. 2 extending from a vertically upper portion of the handle 116 in a generally downward direction (e.g., towards the motor 104 in FIG. 1), however it should be understood that the recessed portion 126 may alternatively, or additionally, be disposed at another aspect of the handle 116, such as at a side of the handle 116 extending in a lateral direction. The recessed portion 126 may be disposed in a conveniently accessible location of the handle 116 in relation to the speed controller 118. In an embodiment, the recessed portion 126 is disposed at a location where the user rests their palm when holding the handle 116 to interact with the speed controller 118.

The recessed portion 126 may be sized and shaped to accommodate a momentary switch 128 in both a resting state and an activated state. As depicted in FIG. 2, the momentary switch 128 is in the resting state. In the resting state, the momentary switch 128 extends (projects) from the recessed portion 126. In the resting state, the momentary switch 128 is only partially disposed within the recessed portion 126.

The momentary switch 128 can have a multi-piece construction including, for example, a base 130 and an articulated arm 132 movably coupled to the base 130.

In an embodiment, the articulated arm 132 can be rotatably coupled to the base 130, e.g., about a rotational axis 134. The rotational axis 134 can be formed by a pin 136 that interfaces with both the base 130 and the articulated arm 132. For example, the pin 136 can extend through openings in each of the base 130 and articulated arm 132 to provide a bearing surface therebetween. The articulated arm 132 may be rotationally biased about the rotational axis 134 towards the resting state by a biasing element 138, such as a torsion spring having coils wrapped around the pin 136. The base 130 and articulated arm 132 can each include a retention feature, such as a channel, that receives and interfaces with an arm of the coil spring to recess the coil spring from contact with the user's fingers during use of the chainsaw 100.

The base 130 is rotatably coupled to the housing 102 (or an internal frame or other support structure of the chainsaw 100) via a pin 140. The base 130 can rotate about a rotational axis 142 formed by the pin 140 to reposition the momentary switch 128 between the activated and resting states. A biasing element 144, such as a torsion spring having coils wrapped around the pin 140, can bias the base 130 to the resting state such that the momentary switch 128 functions as a normally open switch. For example, the torsion spring can include arms that interface with the base 130 and the housing 102 (or other internal frame or support structure of the chainsaw 100) to bias the base 130 about the rotational axis 142 to the resting state.

In an embodiment, the rotational axis 134, 142 are oriented parallel with respect to one another. The rotational axis 134, 142 may also be spaced apart from one another. The rotational axis 134, 142 can be oriented perpendicular to a length of the guide bar 112 (FIG. 1) such that rotation of the base 130 relative to the housing 102 and rotation of the articulated arm 132 relative to the base 130 causes the momentary switch 128 to move in a plane oriented parallel to the guide bar 112. In some instances, the components of the momentary switch 128 may only move in a direction along the plane oriented parallel to the guide bar 112.

Figure 3:
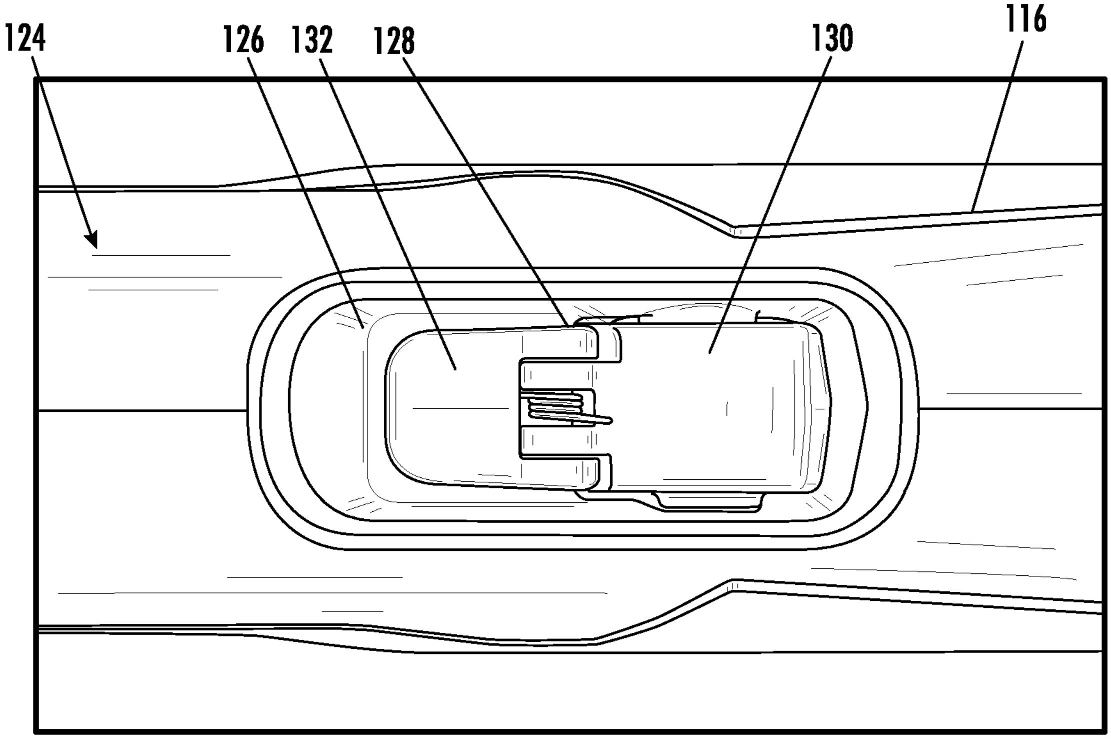
FIG. 3 is a top view of the portion of the handle of the chainsaw in FIG. 1, the portion including the momentary switch of FIG. 2 disposed in an activated state in accordance with embodiments of the present disclosure.

FIG. 3 illustrates the momentary switch 128 in the activated state as seen after rotating the base 130 from the resting state about the rotational axis 142 (FIG. 2). The recessed portion 126 can be sized and shaped to accommodate the momentary switch 128 at least partially within a cutout of the handle 116 when the momentary switch 128 is in the activated state. In an embodiment, at least 50% of the momentary switch 128 is disposed within a volume of the recessed portion 126 when the momentary switch 128 is in the activated state, such as at least 75% of the momentary switch 128 is disposed within the volume of the recessed portion 126 when the momentary switch 128 is in the activated state, such as at least 90% of the momentary switch 128 is disposed within the volume of the recessed portion 126 when the momentary switch 128 is in the activated state, such as at least 95% of the momentary switch 128 is disposed within the volume of the recessed portion 126 when the momentary switch 128 is in the activated state, such as at least 99% of the momentary switch 128 is disposed within the volume of the recessed portion 126 when the momentary switch 128 is in the activated state.

Figure 4:
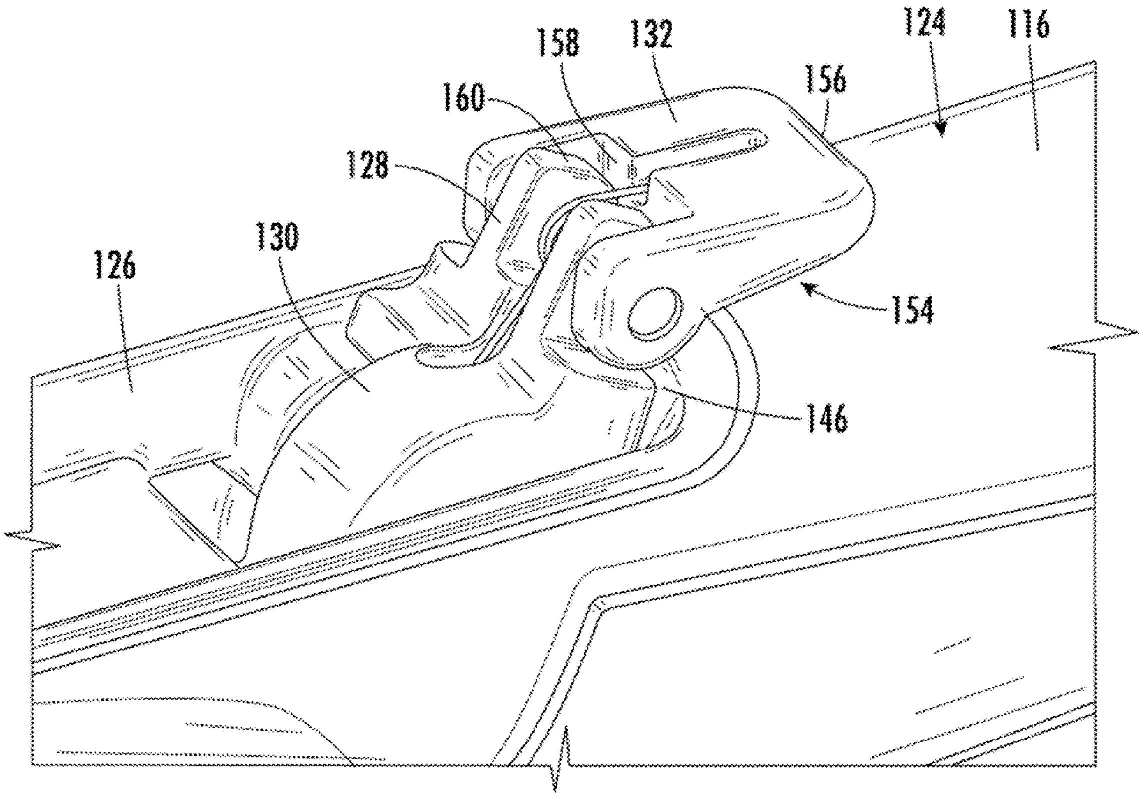
FIG. 4 is a perspective view of the momentary switch in the resting state in accordance with embodiments of the present disclosure.
Figure 5:
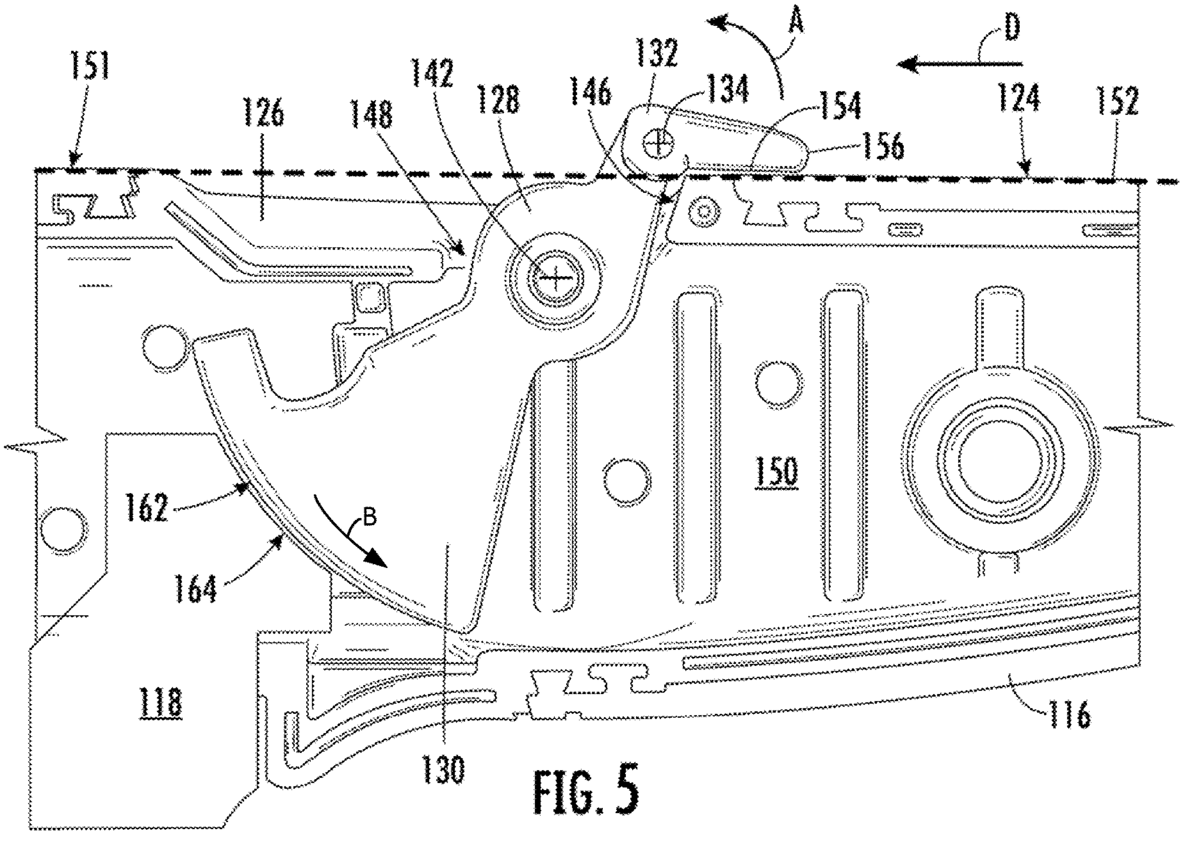
FIG. 5 is a cross-sectional side view of a portion of the handle including the momentary switch in the resting state in accordance with embodiments of the present disclosure.
Figure 6:
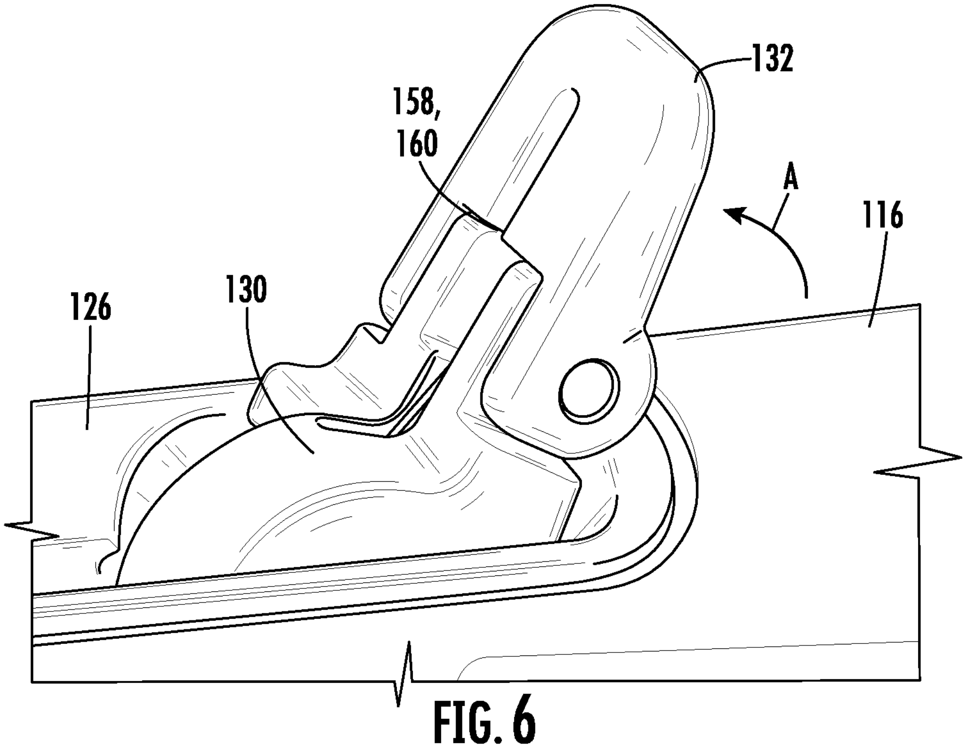
FIG. 6 is a perspective view of the momentary switch in an intermediate state in accordance with embodiments of the present disclosure.
Figure 7:
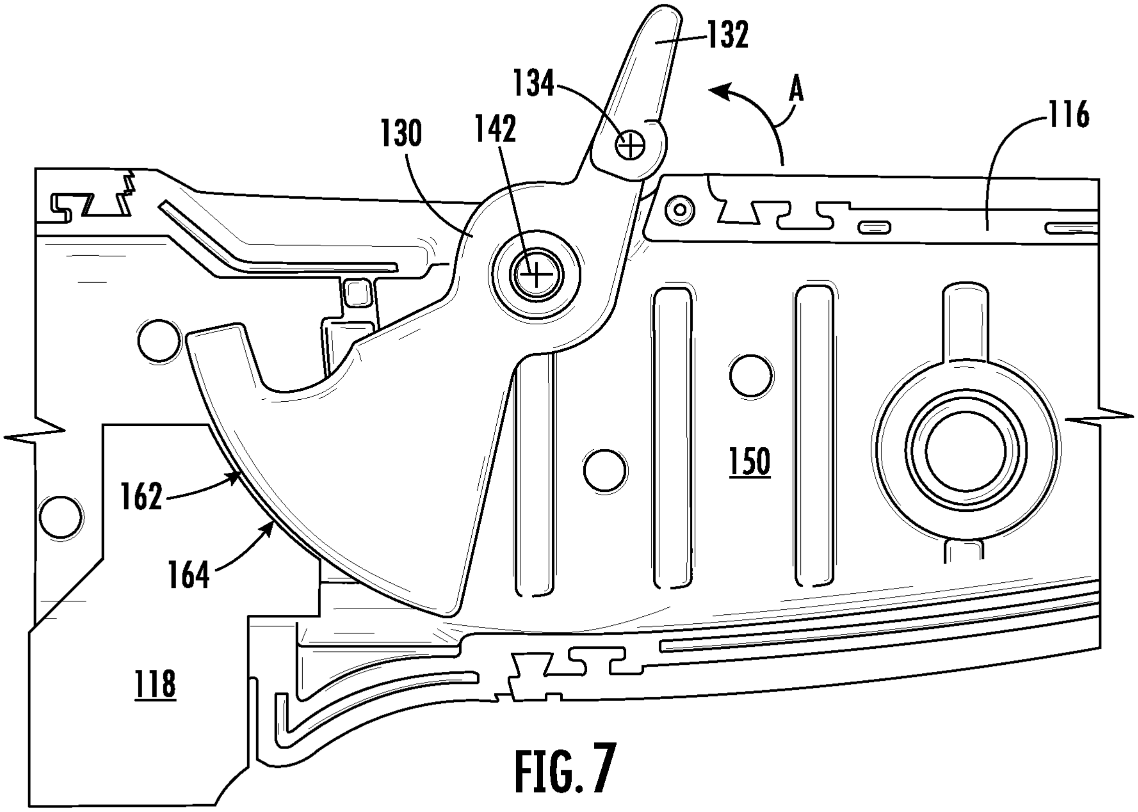
FIG. 7 is a cross-sectional side view of a portion of the handle including the momentary switch in the intermediate state in accordance with embodiments of the present disclosure.
Figure 8:
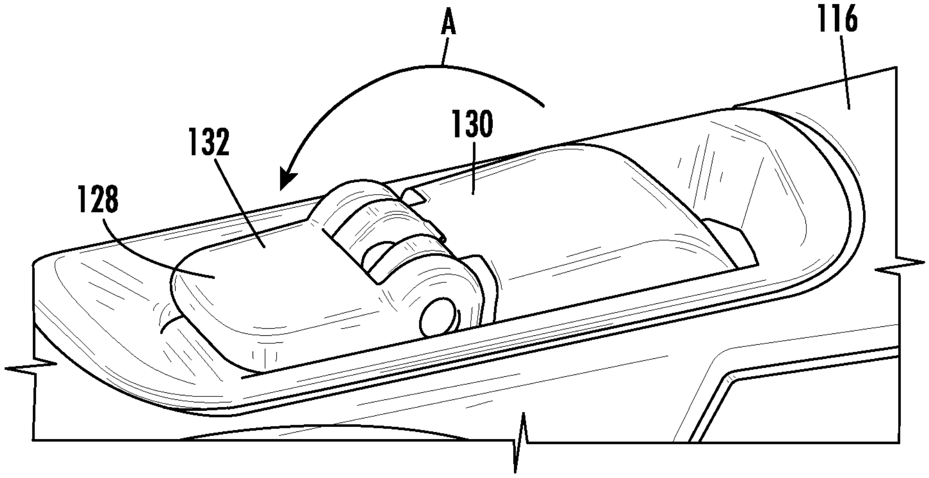
FIG. 8 is a perspective view of the momentary switch in an activated state in accordance with embodiments of the present disclosure.
Figure 9:
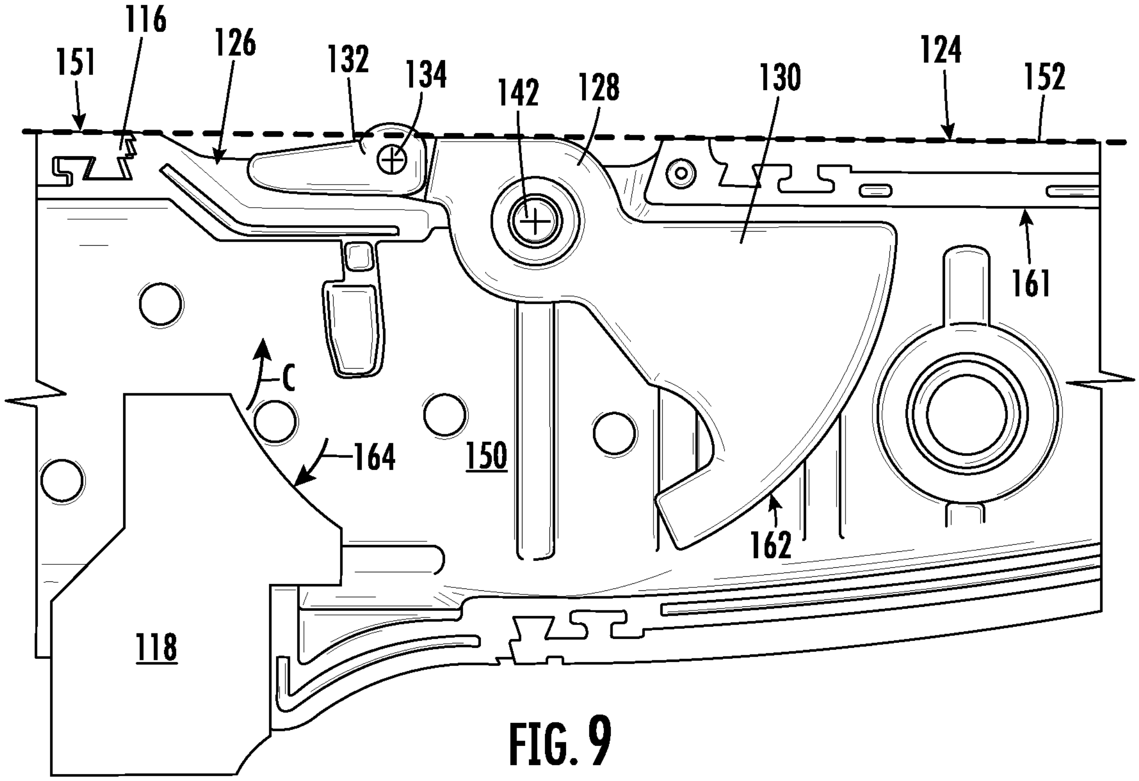
FIG. 9 is a cross-sectional side view of a portion of the handle including the momentary switch in the activated state in accordance with embodiments of the present disclosure.

FIGS. 4 to 9 illustrate the momentary switch 128 in various states according to an example embodiment. In particular, FIGS. 4 and 5 illustrate the momentary switch 128 in the resting state as seen from a perspective view and a cross-sectional side view, respectively, in accordance with an example embodiment;

FIGS. 6 and 7 illustrate the momentary switch 128 in an intermediate state as seen from a perspective view and a cross-sectional side view, respectively, in accordance with an example embodiment; and FIGS. 8 and 9 illustrate the momentary switch 128 in the activated state as seen from a perspective view and a cross-sectional side view, respectively, in accordance with an example embodiment. As described below, the momentary switch 128 is configured to be moved by the user between the resting state, the intermediate state, and the activated state. While the intermediate state is depicted and described as a separate state of the momentary switch 128 between the resting state and the activated state, it should be understood that the intermediate state may refer to a transitional position, or range of transitional positions, between the resting state and the activated state.

In some instances, placement of the momentary switch 128 in the intermediate state may have no impact on operation of the chainsaw 100. For example, moving the momentary switch 128 from the resting state to the intermediate state may not affect controllability of the chainsaw 100. That is, the speed controller 118 can be restricted from moving even after the momentary switch reaches the intermediate state. However, movement of the momentary switch 128 from the activated state to the intermediate state may provide safety control as described herein with respect to the resting state. For example, the speed controller 118 can be prevented from actuating as soon as the momentary latch reaches the intermediate state from the activated state. Further movement of the momentary switch 128 from the intermediate state to the resting state may not further impact actuatability of the speed controller 18.

Referring initially to FIGS. 4 and 5, the momentary switch 128 may be normally open such that the momentary switch 128 returns to the resting state when released by the user. As previously described, the biasing element 144 can bias the momentary switch 128 towards the resting state. In the resting state, the base 130 of the momentary switch 128 is in a first rotational position relative to the handle 116. A sidewall 146 of the recessed portion 126 can delimit rotation of the base 130 to the first rotational position. That is, the sidewall 146 can provide a stop surface against which the base 130 rests in the resting state.

The base 130 may be partially disposed within an internal volume 150 of the handle 116. For example, the base 130 can extend through an opening 148 of the recessed portion 126 of the handle 116. The opening 148 may be sealed to prevent ingress of contaminants, such as wood chips and debris, from entering the internal volume 150.

The handle 116 may define an upper surface 151 that lies along a line (or best fit line) 152 (hereinafter referred to as the line 152). In an embodiment, the base 130 can be disposed on both sides of the line 152. For example, the base 130 may extend above the line 152 such that the rotational axis 134 is disposed at a vertical elevation above the line 152 and the rotational axis 142 is disposed at a vertical elevation below the line 152.

The articulated arm 132 can be rotationally coupled to the base 130 at a location above the line 152. In an embodiment, the articulated arm 132 can extend in a rearward direction, i.e., away from the guide bar 112 (FIG. 1), in the resting state. However, other arrangements and orientations of the articulated arm 132 (and even the momentary switch 128) are possible. The articulated arm 132 can have a surface and/or define a best fit line that extends in a direction generally parallel with the line 152. A gap 154 can separate the articulated arm 132 from the graspable surface 124. The articulated arm 132 can further define a rounded tip 156 or another gap-increasing feature that permits a user to get between the articulated arm 132 and the graspable surface 124. The gap 154 and rounded tip 156 (or the other gap-increasing feature) can allow the user to more easily interact with the articulated arm 132 when repositioning the momentary switch 128 from the resting state. For example, the user may more easily grasp the momentary switch 128 (the articulated arm 132 in particular) to reposition the momentary switch 128 from the resting state by moving their fingers in a direction D and sliding underneath the articulated arm 132. The user can then move the articulated arm 132 to the intermediate position depicted in FIGS. 6 and 7 by rotating the articulated arm 132 about the rotational axis 134 in a direction A.

The articulated arm 132 defines a driving feature, such as a driving surface 158, and the base 130 defines a driven feature, such as a driven surface 160. In the resting state, the driving surface 158 of the articulated arm 132 is disengaged from the driven surface 160 of the base 130. As such, initial force applied on the articulated arm 132 in the direction A causes relative displacement of the articulated arm 132 with respect to the base 130. However, referring to FIGS. 6 and 7, the driving surface 158 comes to drive (seat against) the driven surface 160 when the momentary switch 128 reaches the intermediate state, after which point further force applied to the articulated arm 132 in the direction A causes the base 130 to rotate about the rotational axis 142. If, however, the user releases the articulated arm 132 at the intermediate state, the articulated arm 132 returns to the resting state depicted in FIGS. 4 and 5 under force provided by the biasing element 138.

In an embodiment, the momentary switch 128 can generate a tactile indication to the user when the momentary switch 128 reaches the intermediate state. For example, the user may experience a tactile impulse transmitted through one or more portions of the momentary switch 128 when the driving surface 158 contacts the driven surface 160. Additionally, or alternatively, the user may hear an audible sound, such as a click, when the driving surface 158 contacts the driven surface 160. Yet other user indications may occur to signal to the user that the intermediate state has been achieved.

FIGS. 8 and 9 illustrate the momentary switch 128 as seen after further force is applied in the direction A after the articulated arm 132 reaches the intermediate position depicted in FIGS. 6 and 7. The application of further force in the direction A can cause the momentary switch 128 to reach a second rotational position with respect to the handle 116. An internal surface 161 of the inner volume 150 can act as a stop feature to delimit rotation of the momentary switch 128 at the second rotational position. Additionally, or alternatively, the recessed portion 126 and/or one or more features disposed within the internal volume 150 can delimit rotation of the momentary switch 128. While the direction A is depicted as a rotational direction it should be understood that force may be applied in a linear direction instead of or in addition to a rotational force, causing the momentary switch 128 to move (pivot) in the rotational direction depicted by arrow A.

In some instances, the force required to move the momentary switch 128 from the resting state (FIGS. 4 and 5) to the intermediate state (FIGS. 6 and 7) can be the same, or generally the same, as the force required to move the momentary switch 128 from the intermediate state (FIGS. 6 and 7) to the activated state (FIGS. 8 and 9). For example, the biasing elements 138, 144 (FIG. 2) can be tuned (e.g., selected) such that the force requirements to overcome the restoring force of the biasing elements 138 and 144 is the same. In this regard, the user may not physically detect arrival of the momentary switch 128 at the intermediate state, but rather experience the entire movement from the resting state to the activated state as a smooth, continuous roto-translational movement. In other instances, the force requirement to move the momentary switch 128 from the resting state (FIGS. 4 and 5) to the intermediate state (FIGS. 6 and 7) can be different than the force required to move the momentary switch 128 from the intermediate state (FIGS. 6 and 7) to the activated state (FIGS. 8 and 9). For example, where the biasing elements 138, 144 are torsion springs having the same spring constants, the length of displacement between the location of force applied to the momentary switch 128 and the rotational axis 134, 142 are different, causing the force requirements to differ.

In the activated state, the momentary switch 128 can have (assume) a low-profile configuration, projecting only minimally (or not at all) above the line 152. In this regard, the momentary switch 128 may feel like a continuation of the upper surface 151 of the handle 116 in the activated state. The user can rest their hand, such as their palm, over the momentary switch 128 to maintain the momentary switch 128 in the activated state. However, when the user releases their hand from the handle 116, the momentary switch 128 immediately returns to the resting position unless the user takes an action to prevent such movement (like grabbing the momentary switch 128 as it rotates in a direction opposite direction A or otherwise restricting movement of the momentary switch 128). Thus, the momentary switch 128 remains in the activated state only so long as the user actively controls the chainsaw 100 with their hand on the handle 116.

As described above, the momentary switch 128 may provide additional safety to the user, preventing the chainsaw 100 from operating when the user fails to maintain the momentary switch 128 in the activated state. In an embodiment, the momentary switch 128 can interact with the speed controller 118. More particularly, the momentary switch 128 can prevent the user from actuating the speed controller 118 to drive the motor 104 (FIG. 1) when the momentary switch 128 is in the resting state. Moreover, the momentary switch 128 can further prevent the user from actuating the speed controller 118 to drive the motor 104 when the momentary switch 128 is in the intermediate state. However, once the momentary switch 128 reaches the activated state, the speed controller 118 may be actuatable, thereby allowing the user to activate the motor 104 and drive the chain 110 (FIG. 1).

The relative position of the momentary switch 128 may be detected by a sensor 157 (FIG. 1). The sensor 157 can include a contact switch, an optical sensor, a pressure pad, an electrical sensor (such as a conductive sensor), or the like. The sensor 157 can be in communication with the logic device 108 through one or more wired connections or a wireless communication protocol. The logic device 108 can provide a signal to the logic device 108 including information regarding the momentary switch 128, and more particularly information relating to a relative position of the momentary switch 128. The sensor 157 can inform the logic device 108 when the momentary switch 128 is in one or more of the above-described states. In this regard, the logic device 108 can adjust an operating condition of the motor 104 or even initiate braking to stop movement of the chain 110.

The following description provides an example embodiment of the momentary switch 128 interacting with the speed controller 118. It should be understood that the momentary switch 128 and/or speed controller 118 may be changed or adjusted to accommodate a different interactive arrangement therebetween.

Referring to FIGS. 5 and 7, the base 130 of the momentary switch 128 can define a locking surface 162. The locking surface 162 may have an arcuate contour. In an embodiment, the arcuate contour of the locking surface 162 can define a radius of curvature centered about the rotational axis 142. The locking surface 162 can move in a direction B as the momentary switch 128 is moved in the direction A from the intermediate state (FIGS. 6 and 7) to the activated state (FIGS. 8 and 9). The speed controller 118 can have a complementary locking surface 164 configured to interface with the locking surface 162 to lock the speed controller 118 when the momentary switch 128 is in the resting state. In an embodiment, the complementary locking surface 164 can have an arcuate contour, e.g., the same or substantially similar to the arcuate contour of the locking surface 162. For example, the arcuate contour of the complementary locking surface 164 can define a radius of curvature centered about the rotational axis 142. In this regard, the locking surface 162 can slide past (along) the complementary locking surface 164 while restricting (e.g., preventing) movement of the speed controller 118 until the locking surface 162 is clear of the complementary locking surface 164. In some instances, a small gap can be present between the locking surface 162 and the complementary locking surface 164 to facilitate easier relative sliding between the two surfaces.

As the momentary switch 128 moves from the intermediate state to the activated state, the locking surface 162 of the momentary switch 128 clears the complementary locking surface 164 of the speed controller 118. It is noted that the locking surface 162 may clear the complementary locking surface 164 prior to reaching the position depicted in FIG. 9. Once the complementary locking surface 164 is clear of the locking surface 162 (as depicted, e.g., in FIG. 9), the speed controller 118 may be displaced (e.g., about a pivot axis not depicted in FIG. 9) in an activation direction C to affect a state and speed of the motor 104 (FIG. 1). In implementations where the speed controller 118 affects a variable speed motor 104, the further the speed controller 118 is displaced, the greater the speed of the motor 104 (until reaching a maximum operating speed).

When finished using the chainsaw 100, the user can release the momentary switch 128, causing the locking surface 162 to move in a direction opposite direction B (FIGS. 5 and 7). In some instances, the speed controller 118 may still be actuated in the direction C (FIG. 9). In such instances, the momentary switch 128 can remain in a position between the activated state and the resting state until the speed controller 118 is returned to its resting position (in a direction opposite direction C). More particularly, the speed controller 118 can block return of the momentary switch 128 to the resting state. However, in other instances, where the speed controller 118 is not actuated in the direction C, and is instead in the resting position (FIGS. 5 and 7), the momentary switch 128 can return to the resting state, with the locking surface 162 moving (sliding) past the complementary locking surface 164 to restrict (prevent) actuation of the speed controller 118. Thus, by releasing the momentary switch 128, the user is prevented from accidently re-actuating the speed controller 118.

Figure 10:
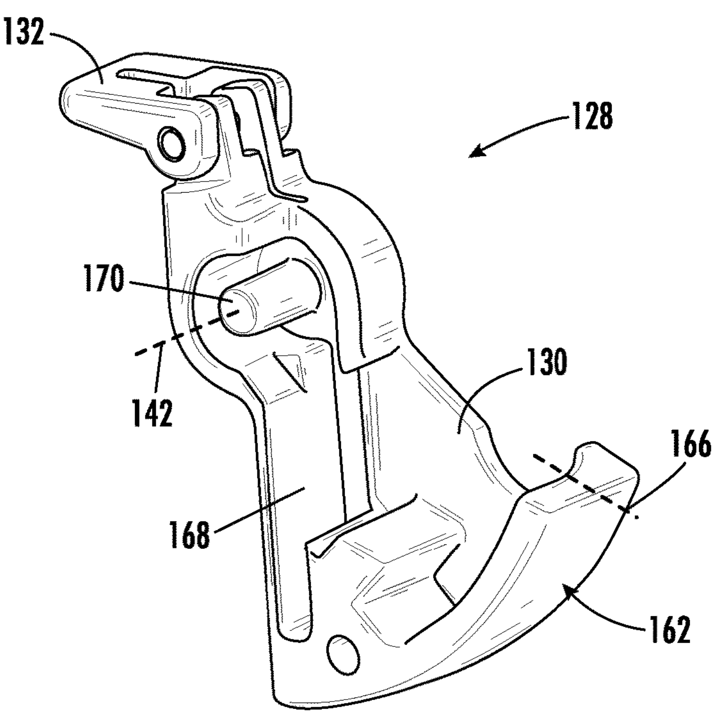
FIG. 10 is a perspective view of the momentary switch as seen from an opposite side in accordance with embodiments of the present disclosure.
Figure 11:
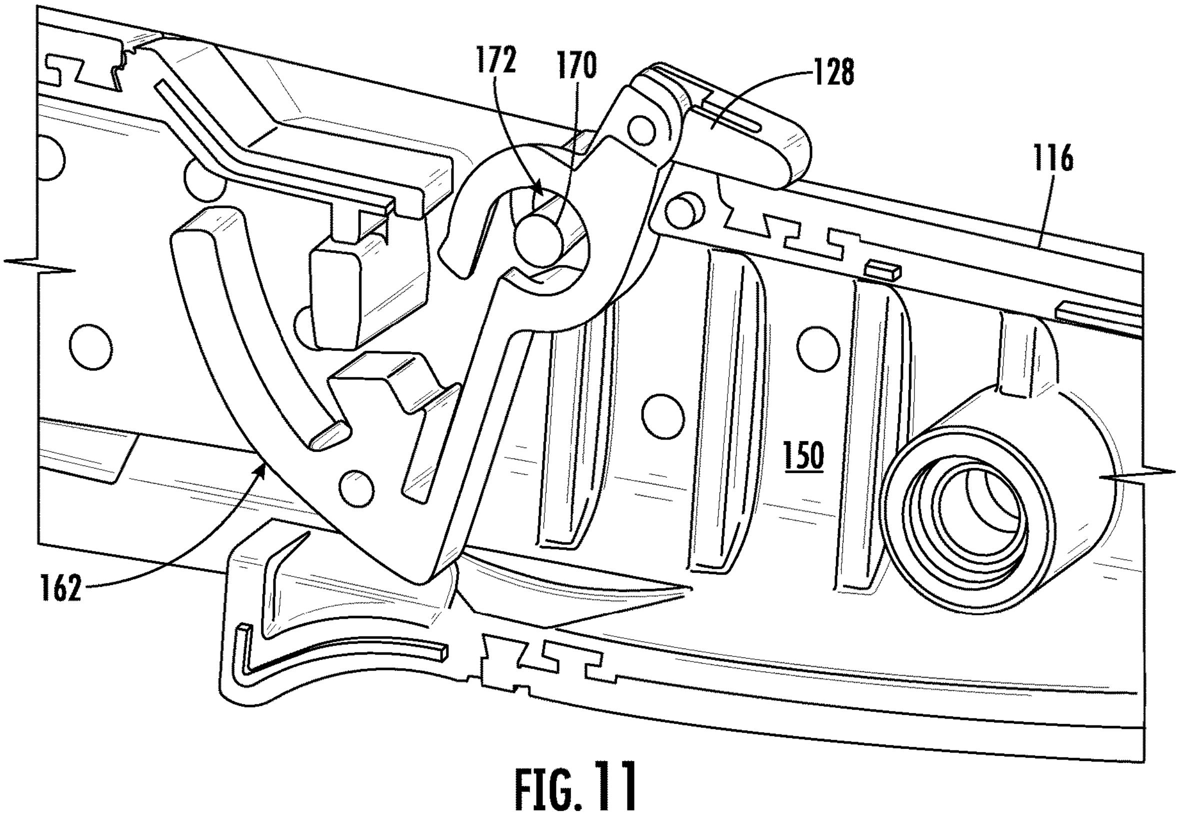
FIG. 11 is a cross-sectional view of a portion of the handle with the momentary switch in a resting state in accordance with embodiments of the present disclosure.

FIG. 10 illustrates a view of the momentary switch 128 as seen from an opposite side than depicted in FIGS. 4 to 9. In an embodiment, the momentary switch 128 can be asymmetric about a central plane 166 that bisects the momentary switch 128. For example, the momentary switch 128 can include a cutout feature 168 that accommodates internal structure of the handle 116, such as one or more posts or internal braces (not illustrated) extending between opposite sides of the handle 116 in the internal volume 150. The cutout feature 168 can interact with one or more of the posts or internal braces to control an aspect of the momentary switch 128. For example, the internal volume 150 can define a post which interacts with the cutout feature 168 to delimit movement of the momentary switch 128. The cutout feature 168 can also, or alternatively, provide a surface against which the biasing element(s) 138, 144 can rest. Additionally, the cutout feature 168 can provide weight-saving benefits by reducing the mass of the momentary switch 128. The reduced mass can lower inertia and facilitate quicker displacement of the momentary switch 128 between the activated and resting states, thereby more quickly rendering the chainsaw 100 inoperable when the user releases the momentary switch 128. In some instances, at least one of the pins 136, 140 can be unitary with the momentary switch 128. For example, the base 130 can define a projection 170 which extends away from the base 130, such as from a location within the cutout 168, and which the momentary switch 128 can be rotatable about. The projection 170 can interface with an opening 172 (FIG. 11) of the handle 116 to provide a pivot axis for the projection 170 and base 130.

Figure 12:
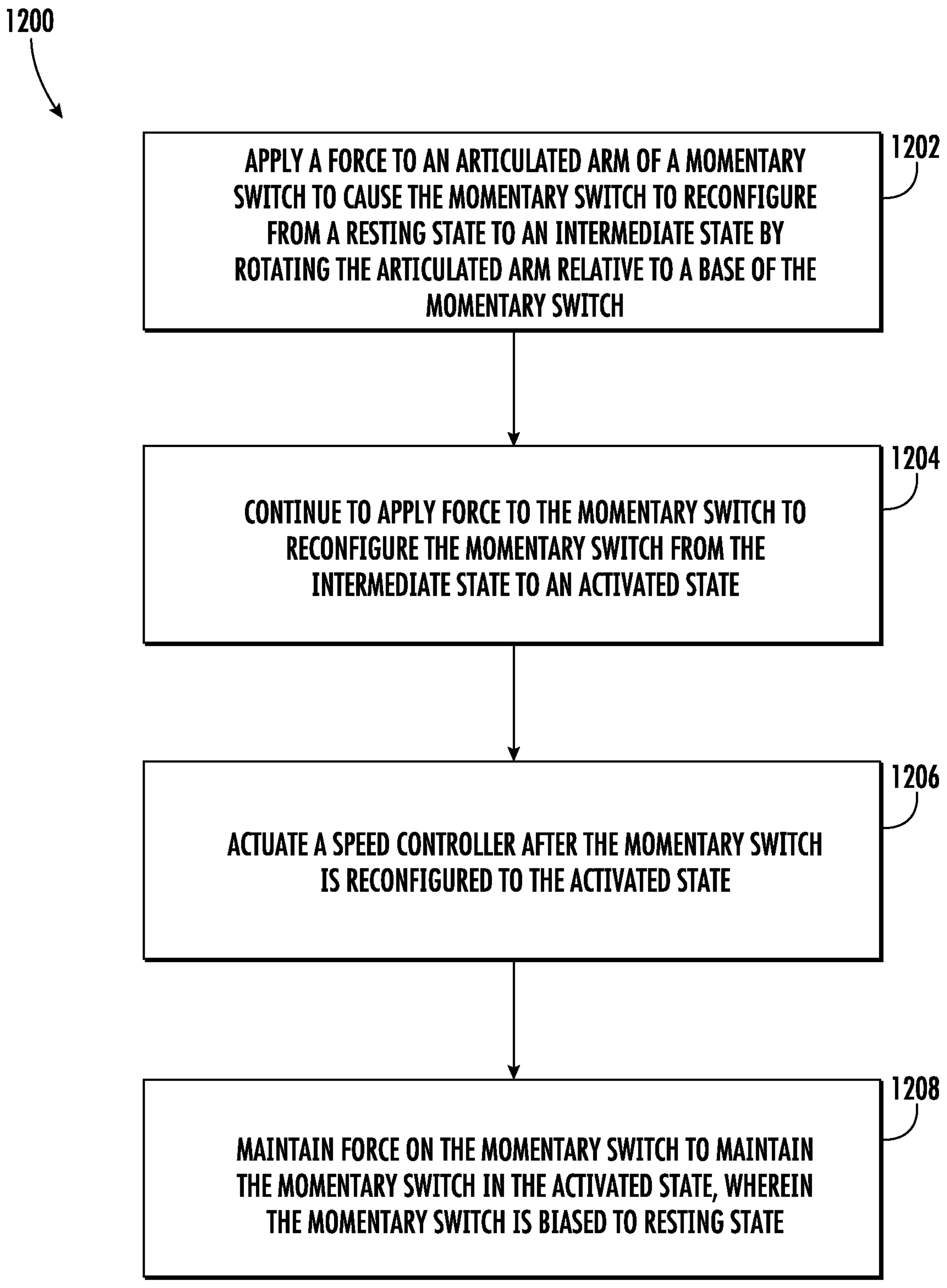
FIG. 12 is a flowchart of a method of using a chainsaw in accordance with embodiments of the present disclosure.

FIG. 12 illustrates a flowchart of a method 1200 of using a chainsaw in accordance with an embodiment. In general, the method 1200 will be described with reference to a chainsaw including the features as describe and illustrated with respect to FIGS. 1 to 11, such as the momentary switch 128. In addition, although FIG. 12 depicts steps performed in a particular order for purposes of illustration and discussion, the method discussed herein is not limited to any particular order or arrangement unless stated to the contrary. One skilled in the art, using the disclosure provided herein, will appreciate that various steps of the method disclosed herein can be omitted, rearranged, combined, and/or adapted in various ways without deviating from the scope of the present disclosure.

The method 1200 can include applying 1202 a force to an articulated arm of a momentary switch to cause the momentary switch to reconfigure from a resting state to an intermediate state by rotating the articulated arm relative to a base of the momentary switch. The force can be applied 1202 directly to the articulated arm, such as at a rounded tip of the articulated arm. Force can be applied 1202 to rotate the articulated arm relative to the base by at least 1°, such as at least 5°, such as at least 10°, such as at least 20°, such as at least 30°, such as at least 40°, such as at least 50°, such as at least 60°, such as at least 70°, such as at least 80°, or even such as at least 90°. The force applied at step 1202 must be great enough to overcome a biasing force that biases the articulated arm to the resting state. The biasing force can be tuned, for example, by selecting between different biasing elements each having a different spring constant.

The force can be applied 1202 until a driving surface of the articulated arm contacts a driven surface of the base. At such time, the user may experience a tactile or audible indication signaling to the user that the momentary switch is in the intermediate state.

The method 1200 can further include continuing to apply 1204 force to the momentary switch to reconfigure the momentary switch from the intermediate state to an activated state. In an embodiment, the force applied at step 1204 can be applied in the same manner as force applied at step 1202, e.g., the force can be applied 1204 to the articulated arm. In such a manner, the user may not be required to reconfigure their hand relative to the momentary switch when transitioning between steps 1202 and 1204. In fact, the continued application 1204 of force may not include a discrete application of force separate from the force applied at step 1202. That is, for example, the force applied at step 1204 can be a continuation of force applied at step 1202. In some instances, the force applied at step 1204 may be different than the force applied at step 1202. For example, the force applied at step 1204 may be greater than the force applied at step 1202. This may allow the base to remain at a relatively fixed position as the momentary switch transitions to the intermediate state. In other instances, the force applied at step 1204 can be the same as force applied at step 1202.

The force applied at step 1204 may cause the base to rotate about a rotational axis by a displacement of at least 1°, such as at least 10°, such as at least 20°, such as at least 30°, such as at least 40°, such as at least 50°, such as at least 60°, such as at least 70°, such as at least 80°, or even such as at least 90°. In some implementations, the articulated arm can remain static relative to the base during application of force at step 1204. That is, the base and articulated arm can move together (i.e., remain relatively spatially fixed with respect to one another) during application of force at step 1204. The force can be applied at step 1204 until the momentary switch reaches the activated state. Prior to the momentary switch reaching the activated state, a speed controller of the chainsaw may be restricted (e.g., prevented) from being actuated by the user. In this regard, the user may not be able to operate the chainsaw, at least under full operating power. In an embodiment, movement of the speed controller can be restricted by the momentary switch until the momentary switch reaches the activated state.

The method 1200 can further include actuating 1206 the speed controller after the momentary switch is reconfigured to the activated state. At such time, the momentary switch is clear of the speed controller, allowing the speed controller to be displaced, e.g. rotated about a pivot axis, from a minimum operating speed to a maximum operating speed. The operator can actuate 1206 the speed controller by a desired amount to affect speed control of the motor and thus drive the chain at a desired speed.

The method 1200 can further include maintaining 1208 force on the momentary switch to maintain the momentary switch in the activated state, wherein the momentary switch is biased to the resting state, e.g., by a torsional spring (such as the torsional spring biasing the base of the momentary switch). Maintaining 1208 force on the momentary switch can be performed by the user's hand firmly holding the handle of the chainsaw. For instance, the user may wrap their palm around the handle and rely on their index finger (and/or middle finger) to operate the speed controller. In the meantime, the user's palm can rest against the momentary switch to provide force to counteract the biasing force trying to move the momentary switch to the resting state. As long as the user maintains 1208 force on the momentary switch, operation of the speed controller is permitted. However, releasing force from the momentary switch can present an opportunity for the momentary switch to return to the resting state, after which point the speed controller can again become restricted (e.g., locked) in a non-actuated (non-powered) state. In some instances, a braking system of the chainsaw can be engaged in response to the momentary switch moving from the activated state to the resting state.

It should be understood that embodiments described herein disallow a user from actuating a speed controller of a chainsaw when the user is not sufficiently grasping the handle. By ensuring the user is sufficiently grasping the handle to allow movement of the speed controller, it is less likely the user will be in a dangerous position whereby the cutting teeth can harm the user. For example, the user is unable to initiate movement of the cutting teeth when performing a blade sharpening operation with the battery still electrically coupled to the chainsaw. Moreover, the force required to maintain the momentary switch in the activated state may require a firm grip of the chainsaw. Thus, the operator cannot use the chainsaw without firmly holding the handle and any loss of grip can result in disablement of the chainsaw.

Embodiments described herein provide mechanical resistance to improper and/or unsafe use. While electrical safety controls can be implemented (e.g., as described above with respect to the sensor 157 communicating a state of the momentary switch to the logic device), it is contemplated herein that the momentary switch forms a mechanical interference that prevents the speed controller from being actuated when the user is not maintaining the momentary switch in the activated state. In some instances, the use of redundant electrical controls (e.g., using the sensor 157 to detect the position of the momentary switch) can provide additional safety to the user, however, electrical controls may be subject to power spikes, wiring shorts, or the like, whereas it is believed that mechanical safety features (alone or in combination with electrical controls) may provide additional safety to the user.

Further aspects of the invention are provided by one or more of the following embodiments:

Embodiment 1. A chainsaw comprising: a guide bar; a chain disposed around the guide bar and movable relative to the guide bar; a motor operably coupled to the chain to drive the chain about the guide bar; a handle; a speed controller in communication with the motor to affect a motor speed; and a momentary switch, wherein the momentary switch restricts actuation of the speed controller when the momentary switch is in a resting state, wherein the momentary switch allows actuation of the speed controller when the momentary switch is in an activated state, wherein the momentary switch comprises a base rotatably coupled to the handle and an articulated arm rotatably coupled to the base, and wherein the momentary switch is biased to the resting state.

Embodiment 2. The chainsaw of embodiment 1, wherein the base of the momentary switch is rotatable relative to the handle about a first rotational axis, wherein the articulated arm is rotatable relative to the base about a second rotational axis, and wherein the first and second rotational axis are oriented parallel with respect to one another.

Embodiment 3. The chainsaw of embodiment 2, wherein the base is rotatably biased about the first rotational axis by a first torsional spring, and wherein the articulated arm is rotatably biased about the second rotational axis by a second torsional spring.

Embodiment 4. The chainsaw of any one of embodiments 1 or 2, wherein the base defines a locking surface having an arcuate contour with a radius of curvature disposed at the first rotational axis.

Embodiment 5. The chainsaw of embodiment 4, wherein the speed controller defines a complementary locking surface that forms an interference with the locking surface when the momentary switch is in the resting state.

Embodiment 6. The chainsaw of any one of the preceding embodiments, wherein the handle comprises a recessed portion extending into the handle from a graspable surface, and wherein the momentary switch is disposed at least partially within the recessed portion in both the resting state and the activated state.

Embodiment 7. The chainsaw of embodiment 6, wherein at least 90% of the momentary switch is contained within a volume defined by the recessed portion when the momentary switch is in the activated state.

Embodiment 8. The chainsaw of any one of the preceding embodiments, wherein the articulated arm includes a driving surface, wherein the base includes a driven surface, and wherein the driving surface contacts the driven surface when the momentary switch is reconfigured from the resting state to an intermediate state.

Embodiment 9. The chainsaw of any one of the preceding embodiments, wherein the articulated arm is disposed above an upper surface of the handle when the momentary switch is in the resting state, and wherein a majority of the articulated arm is disposed below an upper surface of the handle when the momentary switch is in the articulated state.

Embodiment 10. A momentary switch for a chainsaw, the momentary switch comprising: a base configured to be rotationally coupled to a handle of the chainsaw; an articulated arm rotatably coupled to the base; a first biasing element configured to bias the base to a first rotational position with respect to the handle; and a second biasing element configured to bias the articulated arm to a first rotational position with respect to the base.

Embodiment 11. The momentary switch of embodiment 10, wherein the base is configured to be rotationally coupled to the handle about a first rotational axis, wherein the articulated arm is rotatably coupled to the base about a second rotational axis, and wherein the first and second rotational axis are parallel with respect to one another.

Embodiment 12. The momentary switch of embodiment 11, wherein the base comprises a cutout portion and a projection from a side surface of the cutout portion, the projection confirmed to form the first rotational axis for the base relative to the handle.

Embodiment 13. The momentary switch of any one of embodiments 10 or 11, wherein the base comprises an arcuate locking surface configured to form an interference with a complementary locking surface of a speed controller of the chainsaw, and wherein a radius of curvature of the arcuate locking surface is disposed at the first rotational axis.

Embodiment 14. The momentary switch of any one of embodiments 10 to 13, wherein the articulated arm defines a driving surface, wherein the base defines a driven surface, wherein the driving surface is configured to bias the driven surface when force is applied to the articulated arm, wherein the driving surface is disengaged from the driven surface when the momentary switch is in a resting state, and wherein the driving surface is interfaced with the driven surface when the momentary switch is in an intermediate state and an activated state.

Embodiment 15. The momentary switch of any one of embodiments 10 to 14, wherein the momentary switch is configured to be repositionable between a resting state and an activated state, wherein the momentary switch is configured to restrict actuation of a speed controller in the resting state and permit actuation of the speed controller in the activated state, and wherein the momentary switch is biased to the resting state by the first biasing element.

Embodiment 16. A method of using a chainsaw, the method comprising: applying a force to an articulated arm of a momentary switch to cause the momentary switch to reconfigure from a resting state to an intermediate state by rotating the articulated arm relative to a base of the momentary switch; continuing to apply force to the momentary switch to reconfigure the momentary switch from the intermediate state to an activated state; actuating a speed controller after the momentary switch is reconfigured to the activated state; and maintaining force on the momentary switch to maintain the momentary switch in the activated state, wherein the momentary switch is biased to the resting state.

Embodiment 17. The method of embodiment 16, wherein applying force to cause the momentary switch to reconfigure from the resting state to the intermediate state causes a driving surface of the articulated arm to contact a driven surface of the base.

Embodiment 18. The method of any one of embodiments 16 or 17, further comprising releasing the momentary switch, wherein releasing the momentary switch causes the momentary switch to reconfigure to the resting state.

Embodiment 19. The method of any one of embodiments 16 to 18, wherein reconfiguring the momentary switch from the resting state to the intermediate state is performed by rotating the articulated arm about a first rotational axis, wherein reconfiguring the momentary switch from the intermediate state to the activated state is performed by rotating the articulated arm about a second rotational axis, and wherein the first and second rotational axis are spaced apart from one another.

Embodiment 20. The method of embodiment 19, wherein the first and second rotational axis are oriented parallel with respect to one another.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A chainsaw comprising:
- a guide bar;
- a chain disposed around the guide bar and movable relative to the guide bar;
- a motor operably coupled to the chain to drive the chain about the guide bar;
- a handle;
- a speed controller in communication with the motor to affect a motor speed, wherein the speed controller comprises a locking surface; and
- a momentary switch, wherein a complementary locking surface of the momentary switch interacts with the locking surface of the speed controller to restrict actuation of the speed controller when the momentary switch is in a resting state, wherein the momentary switch allows actuation of the speed controller when the momentary switch is in an activated state, wherein the momentary switch comprises a base rotatably coupled to the handle and an articulated arm rotatably coupled to the base, and wherein the momentary switch is biased to the resting state.

2. The chainsaw of claim 1, wherein the base of the momentary switch is rotatable relative to the handle about a first rotational axis, wherein the articulated arm is rotatable relative to the base about a second rotational axis, and wherein the first rotational axis is oriented parallel to the second rotational axis.

3. The chainsaw of claim 2, wherein the base is rotatably biased about the first rotational axis by a first torsional spring, and wherein the articulated arm is rotatably biased about the second rotational axis by a second torsional spring.

4. The chainsaw of claim 2, wherein the base defines the complementary locking surface having an arcuate contour with a radius of curvature disposed at the first rotational axis.

5. The chainsaw of claim 4, wherein the locking surface of the speed controller that forms an interference with the complementary locking surface when the momentary switch is in the resting state.

6. The chainsaw of claim 1, wherein the handle comprises a recessed portion extending into the handle from a graspable surface, and wherein the momentary switch is disposed at least partially within the recessed portion in both the resting state and the activated state.

7. The chainsaw of claim 6, wherein at least 90% of the momentary switch is contained within a volume defined by the recessed portion when the momentary switch is in the activated state.

8. The chainsaw of claim 1, wherein the articulated arm includes a driving surface, wherein the base includes a driven surface, and wherein the driving surface contacts the driven surface when the momentary switch is reconfigured from the resting state to an intermediate state.

9. The chainsaw of claim 1, wherein the articulated arm is disposed above an upper surface of the handle when the momentary switch is in the resting state, and wherein a majority of the articulated arm is disposed below the upper surface of the handle when the momentary switch is in the activated state.

10. A momentary switch for a chainsaw, the momentary switch comprising:
- a base configured to be rotationally coupled to a handle of the chainsaw;
- an articulated arm rotatably coupled to the base;
- a first biasing element configured to bias the base to a first rotational position with respect to the handle; and
- a second biasing element configured to bias the articulated arm to a second rotational position with respect to the base,
- wherein the articulated arm defines a driving surface, wherein the base defines a driven surface, wherein the driving surface is configured to bias the driven surface when force is applied to the articulated arm, wherein the driving surface is disengaged from the driven surface when the momentary switch is in a resting state, and wherein the driving surface is interfaced with the driven surface when the momentary switch is in an intermediate state and an activated state.

11. The momentary switch of claim 10, wherein the base is configured to be rotationally coupled to the handle about a first rotational axis, wherein the articulated arm is rotatably coupled to the base about a second rotational axis, and wherein the first rotational axis is oriented parallel to the second rotational axis.

12. The momentary switch of claim 11, wherein the base comprises a cutout portion and a projection projected from a side surface of the cutout portion, the projection configured to form the first rotational axis for the base relative to the handle.

13. The momentary switch of claim 11, wherein the base comprises an arcuate locking surface configured to form an interference with a complementary locking surface of a speed controller of the chainsaw, and wherein a radius of curvature of the arcuate locking surface is disposed at the first rotational axis.

14. The momentary switch of claim 10, wherein at least one of the first biasing element and the second biasing element comprises a torsion spring.

15. The momentary switch of claim 10, wherein the momentary switch is configured to be repositionable between the resting state and the activated state, wherein the momentary switch is configured to restrict actuation of a speed controller of the chainsaw in the resting state and permit actuation of the speed controller in the activated state, and wherein the momentary switch is biased to the resting state by the first biasing element.

16. A method of using a chainsaw, the method comprising:

applying a force to an articulated arm of a momentary switch of a chainsaw to cause the momentary switch to reconfigure from a resting state to an intermediate state by rotating the articulated arm relative to a base of the momentary switch, wherein applying the force to cause the momentary switch to reconfigure from the resting state to the intermediate state causes a driving surface of the articulated arm to contact a driven surface of the base;

continuing to apply force to the momentary switch to reconfigure the momentary switch from the intermediate state to an activated state;

actuating a speed controller of the chainsaw after the momentary switch is reconfigured to the activated state; and maintaining force on the momentary switch to maintain the momentary switch in the activated state, wherein the momentary switch is biased toward the resting state.

17. The method of claim 16, wherein the articulated arm is biased relative to the base by a torsion spring.

18. The method of claim 16, further comprising releasing the momentary switch, wherein releasing the momentary switch causes the momentary switch to reconfigure to the resting state.

19. The method of claim 16, wherein reconfiguring the momentary switch from the resting state to the intermediate state is performed by rotating the articulated arm about a first rotational axis, wherein reconfiguring the momentary switch from the intermediate state to the activated state is performed by rotating the articulated arm about a second rotational axis, and wherein the first rotational axis and the second rotational axis are spaced apart from each other.

20. The method of claim 19, wherein the first rotational axis and the second rotational axis are oriented parallel to each other.

* * * * *